(12) United States Patent
Coombes et al.

(10) Patent No.: US 9,874,478 B1
(45) Date of Patent: Jan. 23, 2018

(54) SENSOR CLIP AND METHOD OF USING

(71) Applicant: Gooee Limited, St Albans (GB)

(72) Inventors: Simon Coombes, St Petersburg, FL (US); Jonathan Couch, Wilshire (GB); Shmuel Silverman, Novato, CA (US); Andrew Johnson, Klosters (CH)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/586,745

(22) Filed: May 4, 2017

Related U.S. Application Data

(63) Continuation of application No. 29/569,839, filed on Jun. 30, 2016.

(60) Provisional application No. 62/490,388, filed on Apr. 26, 2017.

(51) Int. Cl.
| | |
|---|---|
| *G01J 3/50* | (2006.01) |
| *G01J 1/42* | (2006.01) |
| *G01J 3/51* | (2006.01) |
| *G01J 3/02* | (2006.01) |
| *G01J 1/02* | (2006.01) |
| *H05B 33/08* | (2006.01) |

(52) U.S. Cl.
CPC .............. *G01J 3/505* (2013.01); *G01J 1/0271* (2013.01); *G01J 1/4204* (2013.01); *G01J 3/0291* (2013.01); *G01J 3/51* (2013.01); *H05B 33/089* (2013.01)

(58) Field of Classification Search
CPC .. G01J 3/505; G01J 3/51; G01J 3/0291; G01J 1/0271; G01J 3/4204; H05B 33/089
See application file for complete search history.

(56) References Cited

U.S. PATENT DOCUMENTS

| 8,636,385 | B2 | 1/2014 | Fabbri et al. | |
|---|---|---|---|---|
| 9,046,244 | B2 | 6/2015 | Yang | |
| 9,288,877 | B2 | 3/2016 | Pratt et al. | |
| 9,332,610 | B2 | 5/2016 | Kuo et al. | |
| 2008/0204437 | A1* | 8/2008 | Jensen | G01J 1/02 345/207 |
| 2015/0338077 | A1 | 11/2015 | Johnson | |

FOREIGN PATENT DOCUMENTS

WO   WO-2016039690 A1   3/2016

* cited by examiner

*Primary Examiner* — David V Bruce
(74) *Attorney, Agent, or Firm* — Lisa J. Moyles; Janelle A. Bailey

(57) ABSTRACT

The present system provides a sensor clip system that can be clipped to luminaires of a plurality of shapes and sizes and method of using the sensor clip. Some of the sensors are upward looking (into the luminaire) while others are downward looking (away from the luminaire); and thus face in substantially opposite directions. The sensor clip is adjustable in one, two or three dimensions to be able to easily fit with different sized and shaped luminaires, such that the upward looking sensors may face the incoming light and downward looking sensors face away from the light. The sensor clip system may also provide attenuation of the luminous intensity of the emitted light coming out of the luminaires and extends the longevity and usability of the embedded sensor.

18 Claims, 20 Drawing Sheets

SENSOR CLIP AND METHOD OF USING

CROSS-REFERENCE TO RELATED APPLICATIONS

The present application claims priority to U.S. patent application Ser. No. 29/569,839, entitled Sensor Clip, filed Jun. 30, 2016, and the benefit of U.S. Patent Application 62/490,388, entitled Sensor Clip, filed Apr. 26, 2017, the entire disclosures of which are incorporated herein by reference in their entireties for all purposes.

FIELD

The present system and method relates to a mechanism for positioning one or more sensors relative to direct and indirect light from one or more luminaires.

BACKGROUND

Lighting control systems switch and dim luminaires as they set up light scenes and manage them in space and time. Most of the large lighting control systems are predominantly digitally based systems that allow luminaires to be addressed individually and provide great flexibility. Their user-friendly features include easy programming and operation along with a simple installation process. Lighting control systems can be integrated as a subsystem into a building management system. A lighting control network consists of one or more lighting devices; e.g., electrical ballast, LED devices, and dimmers. The dimmers must support specific interfaces to be able to receive control inputs and dim the light appropriately.

The use of embedded LEDs inside luminaires means that the luminaires do not fail abruptly like traditional light sources anymore; instead, their light output slowly diminishes over time. Smart luminaires these days are possibly attached to a plurality of sensors. The plurality of sensors can be daylight sensors, various kind of field strength sensors used to sense electrical and magnetic fields, temperature sensors, motion sensors, light sensors, proximity sensors, and so on.

In current smart lighting systems, the plurality of sensors, which are located in very close proximity with smart luminaires, are directly exposed to the light with high luminous intensity coming out of those smart luminaires. Further, the electrical emissions around the luminaires can impact close proximity sensors. Luminaires with different lumen emission impacts the sensors' abilities such as light sensing, environmental sensing, low resolution camera sensors, and others. Sensor systems are being designed to fit specific luminaires by shape and later, by electrical and lumen factors. These sensor system designs are limited and need to be refreshed at a very high rate, as the luminaire design and capabilities are constantly updated.

Sensors, by definition, are sensitive instruments and high luminous intensities can easily overload these delicate sensors. The high lux level being measured by the sensor can create erroneous readings leading to inaccuracies in the collected data. Furthermore, some filters such as an Integrated IR filter (e.g., infrared cut-off filter) present on the front of the sensor can be easily degraded by high lux levels, leading to a lower lifetime of the sensor in different applications.

Therefore, in view of the disadvantages associated with currently available methods and devices for accurately sensing high luminosity luminaires having different shapes, there is a need for a device and method that to provide a sensor clip, which can be adjusted to fit multiple luminaire designs and would be able to handle a large variety of light type and lux intensity. Ideally, such a sensor clip would accommodate different sensors and be easily fitted to attach to different luminaires.

BRIEF DESCRIPTION

In various aspects, the present system provides a sensor clip that houses a plurality of different sensors and is easily attachable to a variety of different luminaires (having different shapes from one another). The sensor clip described herein optionally comprises a plurality of sensors situated back to back (i.e.: facing in opposite directions) and can be clipped onto luminaires having a variety of shapes and sizes by adjusting a mounting thickness along with a front face width. As will be shown, this adjustment may be done by moving at least one of horizontal and attachment members extending from the sensor clip housing such that an extension member extending therefrom can grasp onto the luminaire body. In various embodiments, some of the plurality of sensors are downward looking (e.g.: facing away from the luminaire) while others are upward looking (e.g.: facing into the luminaire). In various embodiments, the present sensor clip is optionally adjustable in one, two or three dimensions to be able to easily fit with luminaires, such that the upward looking sensors always face the incoming light and downward looking sensors face away from the light. The present sensor clip may also attenuate the luminous intensity of the emitted light coming out of the luminaires and thus extend the longevity and usability of the embedded sensor life.

In one aspect, the present system provides a luminaire sensor clip system, comprising: (a) a housing having a light-receiving opening therein; (b) a color sensor within the housing, the color sensor being optically aligned with the light-receiving opening in the housing such that light from a luminaire is directed towards the color sensor; (c) an environment sensor mounted on the housing in a position such that light from the luminaire is not directed towards the environment sensor; and (d) an attachment mechanism which may include horizontal and attachment members for connecting the housing onto the luminaire. In different embodiments, the width of the housing may or may not be adjustable, for example by adjusting the position of a sliding member with respect to the housing. In many embodiments, the environment sensor is mounted on a bottom of the housing.

In some aspects of the present system, an attenuation chamber is included for reducing high lux values of the light emitted by the luminaire before the light reaches the color sensor by reflecting the light off the interior surface of the attenuation chamber. Additionally, a mirror can be used to reflect light received into the light-receiving opening directly towards the color sensor. The attenuation chamber may have a fixed or variable width. Optionally, a dampening and filtering screen can be positioned between the light-receiving opening in the housing and the color sensor to remove infrared and ultraviolet light elements from the luminaire light before the light reaches the color sensor.

The present system also provides a method of sensing illumination properties of a luminaire, by: (a) providing a sensor clip having a housing, wherein the sensor clip is dimensioned to be clipped onto a luminaire; (b) receiving and/or directing light from the luminaire into the housing such that the light is directed towards a color sensor positioned within the housing or the light is received directly from the luminaire; and (c) permitting light from the luminaire to reach an environment sensor on or in the housing, wherein the environment sensor is positioned such that light from the luminaire is not directed towards the environment sensor or the light is received indirectly from the luminaire.

Embodiments in accordance with the present disclosure provide a system that includes a sensor clip, which is externally or internally attachable to luminaires of a plurality of shapes and sizes by adjusting the mounting thickness along with the front face width. In other words, the relative size or thickness of the sensor clip (when viewed from the front) can be adjusted by moving a sliding member such that the sensor clip can clip onto a luminaire body.

In one embodiment, the sensor clip further includes an attenuation chamber. The attenuation chamber opening is optionally at the far side of the telescopic arm facing upwards towards the incoming luminaires' light. In the attenuation chamber, the incoming light coming from the plurality of luminaires is collected and collimated/attenuated to reduce the high luminous intensities of the incoming light. In one embodiment, the color sensor is placed at the end of the attenuation chamber. In this case, the direction of the color sensor can be at any angle to support effective attenuation and it is no longer required to be facing up, but facing the incoming attenuated light. In one embodiment, the color sensor (located in the attenuation chamber) is facing the incoming attenuated light (that is reflected towards the color sensor by a mirror), and the environment sensor (located outside the attenuation chamber) is facing downward away from the housing of the sensor clip.

In one embodiment, the attenuation chamber, which can be disposed within the sliding member part of the sensor clip, comes in two different variants. One variant is a fixed length attenuation chamber. In this variant, the sliding member includes the environment sensor and the color sensor, and adjusting the position of the sliding member also moves the entire attenuation chamber as a single unit, maintaining the length and structure of the chamber. The second variant of the sensor clip comes with an adjustable length attenuation chamber.

In one embodiment, the sensor clip further includes a Dynamic Attachable Dampening and Filtering Screen (DADFS). Depending on the light color and/or intensity, the installer can change this screen from one to another. This screen assists in performing dampening and filtering operations on the incoming light, which can impact luminous intensities and extend the life/longevity of the color sensors. The intensity of a light source is a measure of wavelength-weighted power emitted by the light source. Light sources can vary greatly in power (for example, from 2 Watts to 1000 Watts) where optics will also direct the light or lux and adjust the intensity as well. Sensors will have a maximum range and so adding dampening screens as part of the telescopic arm is a means to reduce intensity and not overexpose the sensor in high lux intensity situations.

In another embodiment the sensor clip further includes that the DADFS performs filtering operations on the incoming light of high luminous intensities. In this embodiment, the DADFS Filtering operations are necessary to remove any non-visible elements like Infrared (IR) elements and/or Ultra Violet (UV) elements present in the incoming light. In one embodiment the filtering operation is performed at the embedded sensor. In another embodiment the DADFS provides a built-in ability to all of the embedded color sensors by adding additional filtering elements in the sensor arm/clip. This gives the ability to improve upon the filtering readings and reduce the aging problems of the sensor filters.

Embodiments in accordance with the present system provide a method to attenuate high luminous intensities of light coming out of a plurality of luminaires using a sensor clip assembly. The sensor clip is externally attachable with luminaires of any shape and size. In one embodiment, both the color sensor and the environment sensor are located in different positions on the sensor clip assembly. The sensor clip optionally further provides an attenuation chamber. The attenuation chamber in one embodiment is a fixed length attenuation chamber. The attenuation chamber in another embodiment is a variable length attenuation chamber. The sensor clip further includes slidable members that can be extended horizontally and vertically.

The present method of operation comprises the luminaires emitting light with high luminous intensities, emitted light with high luminous intensities hitting the sensor clip, and finally entering the attenuation chamber of the sensor clip. Inside the attenuation chamber the incoming light bounces off the chamber walls; therefore, the high luminous intensities of the incoming light gets attenuated to a certain extent before it hits the color sensor. The color sensor performs further processing on the received light having low luminous intensities.

Embodiments in accordance with the present system further provide a method to attenuate high luminous intensities of light coming out of a plurality of luminaires using a sensor clip. The sensor clip is externally attachable to luminaires of any shapes and sizes. The sensor clip comprises one light facing sensor (color sensor) and one environmental facing sensor (environment sensor). The sensor clip may further include an attenuation chamber. The sensor clip also includes a Dynamic Attachable Dampening and Filtering Screen (DADFS), which is responsible for performing dampening and/or filtering operations on the incoming light. In one embodiment, the DADFS is inserted into the attenuation chamber. The insertion location is fixed. In one embodiment, the attenuation chamber is a fixed size and is moving with the telescopic arm, and the DADFS is located in the moving fixed size chamber. In another embodiment, the attenuation chamber is variable in size and can be extended when the sliding member is extended, and the DADFS is inserted in the base of the chamber in a specific distance from the fixed color sensor.

These and other advantages will be apparent from the present application of the embodiments described herein. The preceding is a simplified summary to provide an understanding of some aspects of embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE FIGURES

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which:

FIG. 4A illustrates a top perspective sectional view of a sensor clip in a fully compressed position;

Figure 1:
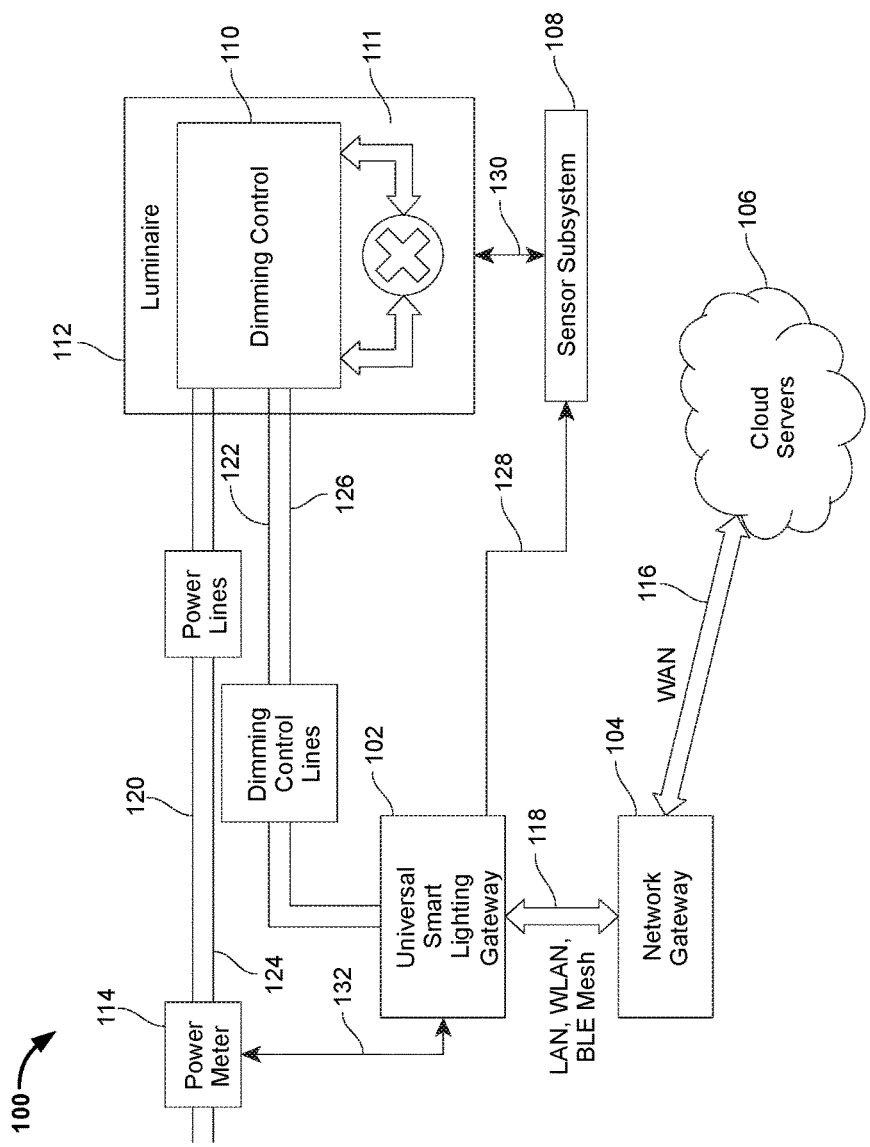
FIG. 1 illustrates a high-level system diagram of the gateway and the connected sensors and luminaire.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

DETAILED DESCRIPTION

Reference will now be made in detail to various embodiments. Each example is provided by way of explanation, and is not meant as a limitation and does not constitute a definition of all possible embodiments. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to.

The present system is optionally composed of an LED and/or electric ballast luminaire ("luminaire") or a plurality of LEDs and/or electric ballasts ("luminaires"), which are controlled by a single dimming device or dimmer or dimming controller. The dimming device controls the dimming level of the luminaires. A dimming device interface (which in most cases can be a two-wire, or a four-wire connection, when a luminaire is color-temperature control enabled) is connected to the universal smart lighting gateway ("gateway"). The gateway is capable of communicating and handling a plurality of sensors and sensor protocols via its sensor interface. The present disclosure does not limit the type of hardware/wire/bus interfaces between the gateway and the sensor devices; e.g., the number of wires, the type of wires or bus connectors. The connections can be as simple as analog interface connectors and/or electrical/digital bus connectors of any kind. The sensors' interface is tagged as "sensor interface".

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 depicts an illustrative embodiment of a system 100. The system 100 may also be referred to as a scenario/an environment. The system 100 includes at least one protocol agnostic gateway 102, at least one of a plurality of luminaires 112 and a plurality of LED's 111, and a dimming control 110. The luminaire 112 is a system that may include a single luminaire or multiple luminaires connected with a single common interface to power lines 120, 124 and dimming control lines 122, 126. There is a power meter 114 that is connected electrically between the gateway 102 and the luminaire 112 and is connected electrically to the luminaire 112 via the power lines 120, 124. The power meter 114 may be connected to the gateway 102 via the power meter interface 132.

As illustrated in FIG. 1, the system 100 includes a sensor subsystem 108, (for which the sensor clip described herein is particularly suitable for connecting the sensor to the luminaire), that connects via connection 130 to the luminaire 112 on one side and to the gateway 102 via a sensor interface 128 on the other side. The connection 130 to the luminaire 112 is physical and is not limited to a specific location. The location of the sensor clip may be different for various types of sensors and luminaires that need to be positioned. The system 100 includes a backhaul interface 118 connected to the gateway 102 and a network gateway 104. The backhaul interface 118 may be wired or wireless Local Area Network (LAN), including one or more of Mesh Bluetooth Low Energy (Mesh BLE), Smart Mesh, Bluetooth Mesh, WLAN, ZigBee, and/or Ethernet LAN. The backhaul interface 118 and the communication protocol is prior art and is included in a separate disclosure. In one embodiment this interface is Mesh BLE. According to an aspect, the gateway 102 is connected with the network gateway 104, which resides between the local networks to a wide area network (WAN) 116. The WAN 116 connects the gateway 102 to cloud computers/servers 106 for operational and management interfaces.

Figure 2:
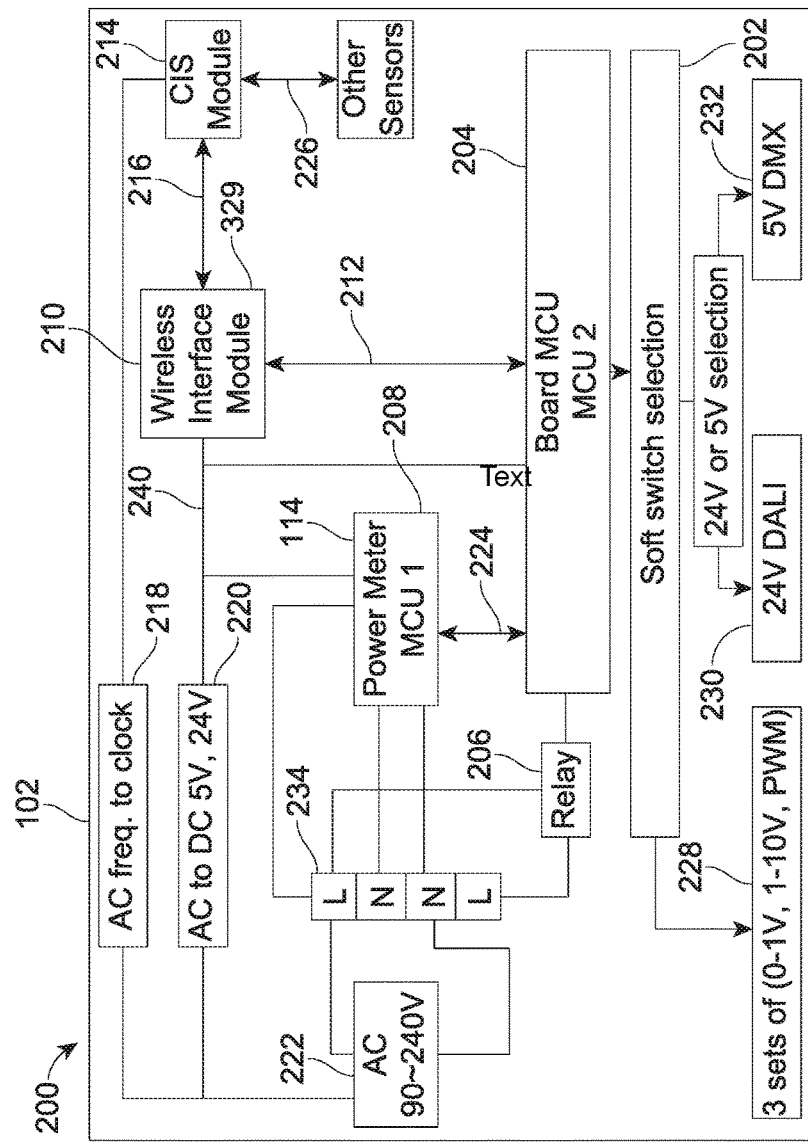
FIG. 2 illustrates a gateway box diagram with sensors and connections to those sensors.

FIG. 2 depicts a system 200 including the gateway 102, sensor modules 214 and sensor communications 216. The sensor subsystem modules 214 are encapsulated within the sensor clip (not shown in further detail). A soft switch 202 to select between different electrical dimming interfaces is provided. The soft switch 202 may be actively used to search for the correct protocol between the gateway 102 and the luminaire 112 (not shown in this figure). In other embodiments the dimming control mechanism is done via a hard switch (not shown in this figure). The luminaire 112 may be a dimming luminaire 112. The protocol modules 228, 230, and 232 are the software implementation of the dimming interfaces that reside in the gateway 102. The supported dimming protocol includes several sets of protocols, such as, for example, 0V-10V, 1V-10V, PWM 228, protocols over 0V-10V and/or 1V to 10V, a 24V DALI 230 protocol, and a 5V DMX 232 protocol. The protocols may each include algorithms, which may be implemented in a Micro Controller Unit 2 (MCU-2) 204. The MCU-2 204 is powered by an AC to DC 5V, 24V power module 220 via a power line connection 240. MCU-2 204 may also be connected to a power meter 114 via a Micro Controller Unit 1 e.g., MCU-1 and a Universal Asynchronous Receiver/Transmitter (UART) 224. The MCU-2 204 is also connected to a Relay 206. MCU-2 204 may also be connected to a Wireless Interface Module (WIM) 210 via a Serial Peripheral Interface (SPI) bus 212. In an embodiment, the MCU-2 204 also controls the Relay 206, which may be designed to cut off/block the current to the luminaire 112 upon a decision by the MCU-2 204. The power cutoff can be used to disconnect power from the controlled luminaire subsystem (see, for example, FIG. 1). The WIM 210 is implemented as Bluetooth Low Power (BLE) device that uses the Mesh BLE protocol to connect with other devices, as well as having the SPI bus 212 and an Inter-Integrated Circuit Two-Wire Serial Interface bus (TWSI) 216. The WIM 210 is connected to the Camera Interface System (CIS) module 214, which may be, for instance, an environment sensor and a Red, Green, Blue (RGB) sensor combination device. The CIS module 214 can be extended via a second TWSI bus 226 with other sensor modules. The CIS module 214 may require a clock, which is received via an AC Frequency to a clock module interface 218. The WIM 210 may require power, which is typically received via the AC to DC 5V, 24V power module 220 via the power interface line 240. An AC Power 90V-240V power module 222 is relayed to the MCU-2 204 via an Line Control (LNNL) 234, and relayed from the MCU-2 204 to the soft switch 202 for power selection for the dimming protocol interfaces. The AC Power module 222 may also be relayed to the power meter 114 via the LNNL 234, which measures all power delivered to the luminaire 112. The LNNL 234 illustrated in FIG. 2 may provide the physical electrical line connections.

Embodiments in accordance with the present system generally include a sensor clip that is attachable to luminaires of a plurality of shapes and sizes. This sensor clip has a fully compressed position state as will be described in greater detail below with specific reference to the figures. In a fully compressed position both its sliding member and sensor housing are fixed in their initial position. This sensor clip supports the movement of the sliding member and the sensor housing between a fully compressed position to a fully expanded position. In the fully expanded position, both the horizontal and the vertical locations of sensor openings are at a max vertical and horizontal position away from the attachment member or base of the sensor clip. Within embodiments in accordance with the present system, extension of the sliding member and/or housing can be varied to support the required distance of the sensors from the luminaires.

In one aspect of the present disclosure, the sensor clip includes a plurality of upward facing sensors and a plurality of downward facing sensors that are placed or facing back-to-back (about 180 degrees) to one other. The upward facing sensors face directly towards the direction of the luminaire's incoming light. The downward facing sensors do not face into the luminaire's incoming light but instead face away from the luminaire light and instead sense the environment beneath and around the luminaires. The sensor clip has an attachment member and a sliding member attached to the attachment member, wherein the sliding member is capable of moving up and down, thereby adjusting the height of the sensor clip housing (in a vertical direction), and the sensor housing slides relative to the sliding member to adjust the length of the sensor clip housing (in a horizontal direction). As such, the upward facing sensors can be moved to a position such that they are always directly exposed to or in direct alignment with the incoming light from the luminaires.

In one embodiment, the upward facing plurality of sensors are capable of measuring multiple color channels ("i.e. color sensors") while directly facing the luminaires' incoming light. Such a color sensor can be used to measure both the color content and the color intensity present in the light coming out of the plurality of luminaires. In addition, the color sensor can be based on a single color or a plurality of colors. In one embodiment the color sensor based on the plurality of colors can be the "RGB sensor" measuring the content of the Red, Green and Blue channels of the incoming light.

In one embodiment, the design of the sensor clip allows an installer to select the location of the upward facing sensors such that the color sensor can be placed facing the luminous opening of the plurality of luminaires, thereby minimizing the amount of blocked light. The positioning of the sensor clip adjusts the location of the sensor opening on the housing such that the sensor can be positioned at a desired location relative to the incoming luminaires' light. This advantageously improves the ability to use one sensor housing to fit with a multitude of luminaires (circular, square, linear, etc.). This supports situations where the lux intensity is too much for the sensors. In this last case, the installer only needs to adjust the distance to reduce the lux intensity read by the sensor.

In one embodiment, the downward facing plurality of sensors can be low resolution imaging environment sensors. Such environment sensors are exposed and facing outwards/downwards below or away from the luminaire. The environment sensor is used for monitoring the environment around the luminaires. In one embodiment, the environment sensor includes three (or more) different sensors: a low-resolution image sensor, an ambient light sensor, and a temperature sensor. Without limitation, the present disclosure is referring to the three sensors included in the environment sensor as the "environment sensor". Further, without limitations, the environment sensor may include less or more sensors than are described here. The environment sensor is within the combination of sensors described herein such that there is enough information to measure the environment, as described in this disclosure. Embodiments in accordance with the present disclosure can use other sensors and more types of sensors to characterize the environment. In all cases, this disclosure refers to these combinations of sensors as "environment sensor".

According to an aspect, the color and environment sensors are positioned approximately 180 degrees relative to each other. The color sensor receives light from the luminaires through a gap or light-receiving opening in the housing of the sensor clip. The environment sensor faces away from or downwards, thereby sensing the environment around the luminaires.

Figure 3A:
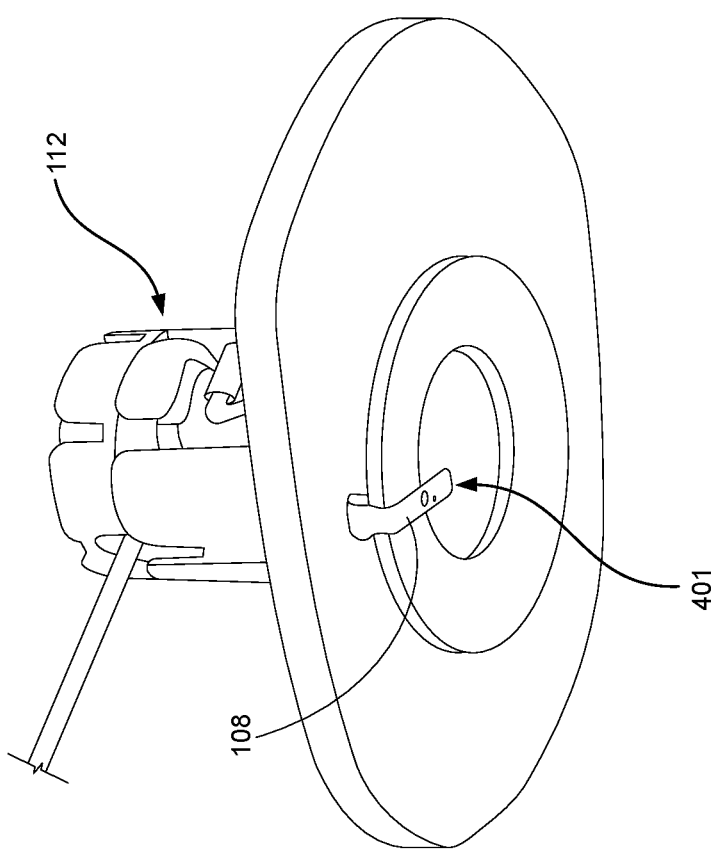
FIGS. 3A, 3B and 3C illustrate various bottom views of a sensor clip being attached to a variety of luminaires.
Figure 3B:
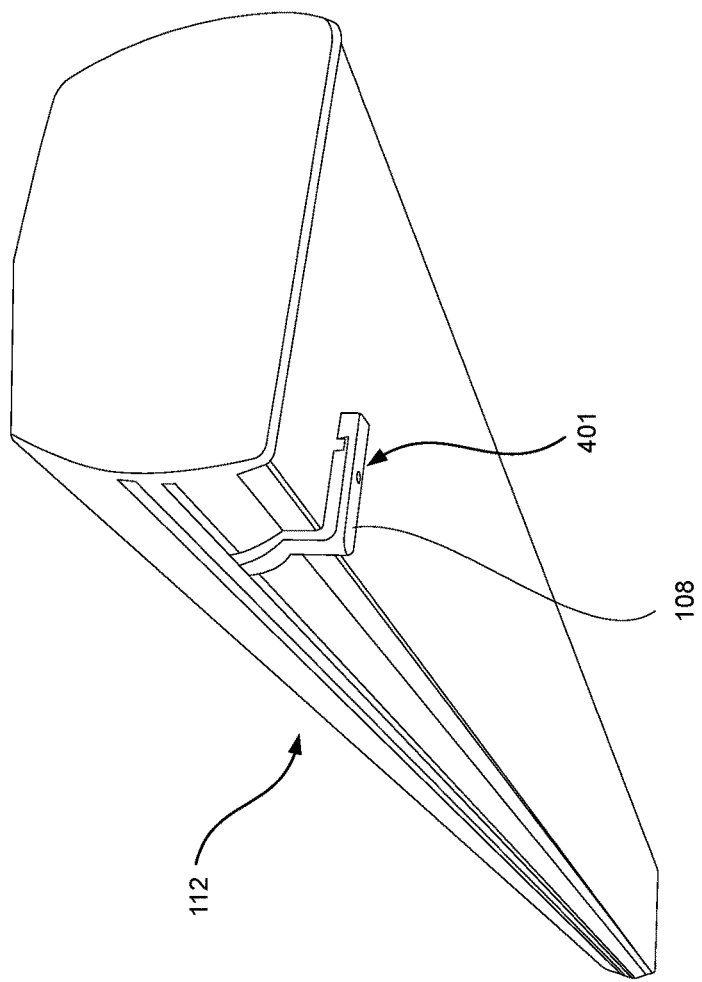
Figure 3C:
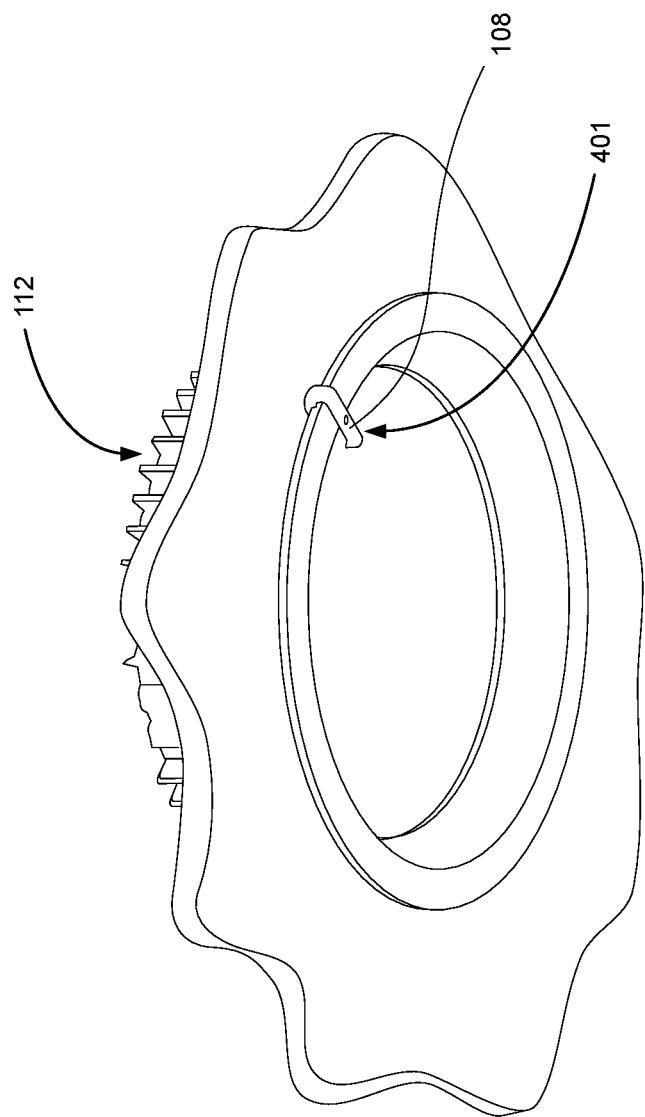

FIGS. 3A, 3B and 3C illustrate various views of the present sensor clip 108 being attached to a variety of differently shaped luminaires 112. As will be shown, the sensor clip 108 is easily attached to the plurality of differently shaped luminaires 112 by adjusting the mechanism as will be discussed in further detail hereinbelow with reference to FIGS. 4A to 10. Furthermore, FIGS. 3A, 3B and 3C also depict an opening 401 in the sensor clip 108 configured for receiving an environment sensor 412 (see, for instance, FIG. 4A), which is visible from underneath the sensor clip 108. While reference is made to "under", "over", "downward", "upward", "top", "bottom", "horizontal", "vertical", "in", "out" and the like, it will be understood by one of ordinary skill in the art that these terms are used to describe positioning of features relative to one another, and are not limited in the actual direction. In other words, the term "downward" does not necessarily mean that the feature is pointing down, but rather that the feature is pointing in an opposite direction than the feature that its directional aspect is related to. The opening 401 is shown facing downwards, (e.g., aligned to indirectly receive light from the luminaire 112), in each of the embodiments shown in FIGS. 3A-3C, but it will be understood that the opening 401 could also be positioned in other directions with respect to the direction of the light, so long as the opening 401 is not positioned in direct alignment with the direction of the light/illumination.

Figure 4A:
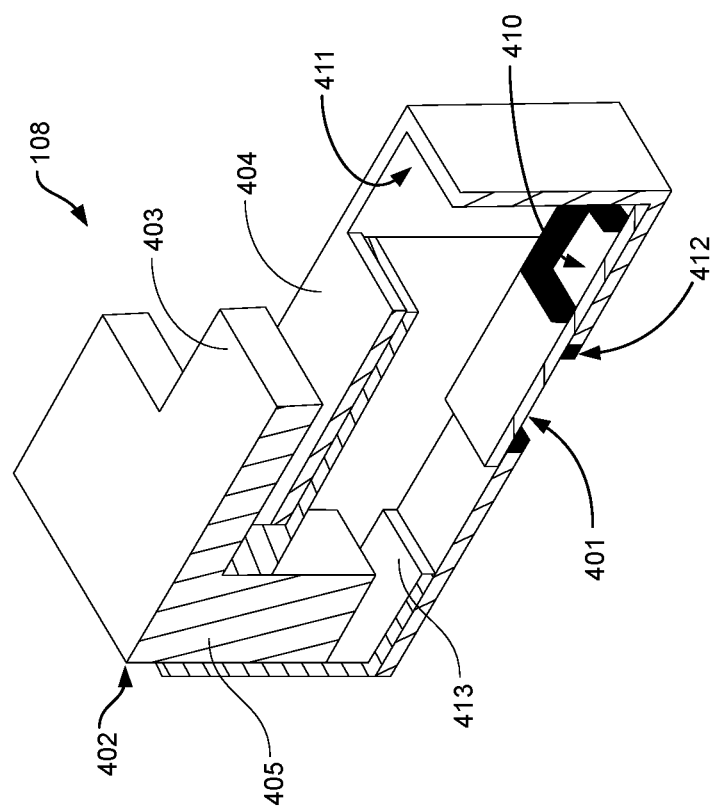
FIG. 4A illustrates a bottom perspective sectional view of a sensor clip in a fully compressed position.
Figure 4B:
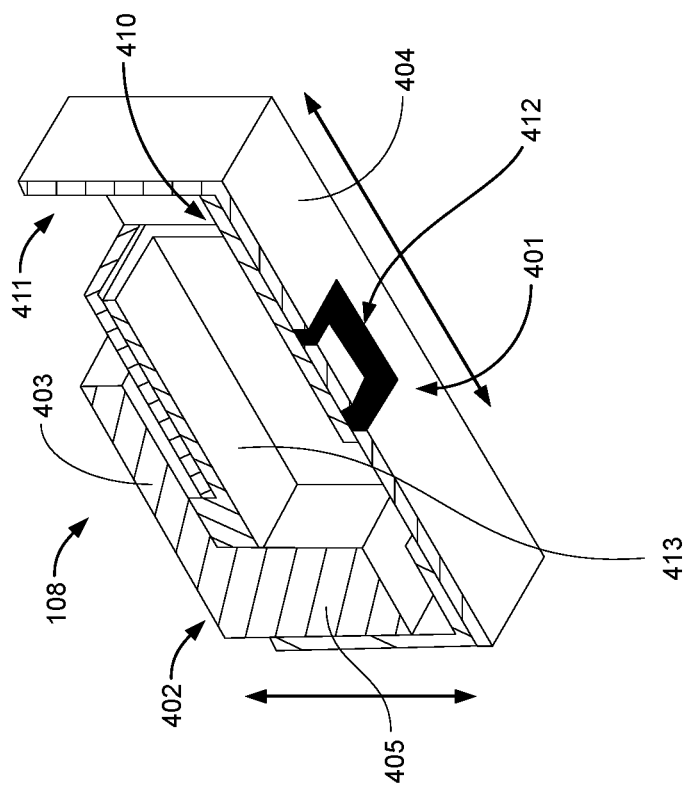
FIG. 4B illustrates a bottom perspective sectional view corresponding to FIG. 4A.

FIGS. 4A and 4B depict a cross-sectional perspective view of the sensor clip 108 in a fully compressed position, wherein each figure shows the same cross-sectional perspective view from a different angle. The sensor clip 108 shown herein provides a mechanism configured for extending a sensor housing 404 in more than one direction. Thus, the housing 404 is capable of being telescopically extended inwards and outwards relative to the luminaire. To that end, the sensor clip 108 includes an attachment member 402, which includes an attachment arm 403 configured for attachment to the luminaire as will be described in greater detail hereinbelow, and a vertical leg 405 extending at a right angle to the attachment arm 403. A sliding member 413 is configured to be slidingly received by the vertical leg 405 of the attachment member 402, such that the sliding member 413 slides vertically relative to, or along a length of, the vertical leg 405. The housing 404 is configured to be slidingly received by the sliding member 413, such that the housing 404 slides horizontally along the sliding member 413. Thus, the housing 404 is capable of being positioned relative to the luminaire by moveably sliding the sliding member 413 with respect to the attachment member 402 and moveably sliding the housing 404 with respect to the sliding member 413.

As shown herein, the sensor housing 404 includes two light-receiving openings—a top opening 411 positioned in the sensor housing 404 in alignment with the direct light from the luminaire and a bottom opening 401 generally positioned in the housing 404 opposite or away from the top opening 411. In other words, the light-receiving openings can be positioned in the housing such that light emitted by the luminaire is either directly received or indirectly received by sensors housed within the housing. As shown in FIGS. 4A and 4B, a color sensor 410 is aligned with the top opening 411, and an environmental sensor 412 is aligned with the bottom opening 401. According to an aspect, the color sensor 410 is positioned in the housing 404 facing upwardly and the environmental sensor 412 is positioned facing downwardly. As shown herein, the color sensor 410 is positioned in/on the housing 404 in a direction that would be facing direct light from the luminaire (see, for instance, FIG. 4C), while the environment sensor 412 is positioned facing in the opposite direction, facing downwardly on the bottom side of the housing 404. As such, the environment sensor 412 is not directly facing the direct light from the luminaire. While the positions of the color sensor 410 and environment sensor 412 are shown as being positioned to face in opposite directions, it will be understood by one of ordinary skill in the art that the sensors (either the environment sensor 412 or the color sensor 410) can be placed in positions at varying levels of direct versus indirect illumination from the luminaire. It is also contemplated that the sensor housing 404 could be configured as a cylindrical housing, (not shown), rather than the rectangularly-shaped housing depicted herein. According to an embodiment, the color sensor 410 is positioned below the top opening 411 and is facing upwards towards the luminaires through the top opening 411. The environment sensor 412 is facing downwards from the bottom opening 401b, sensing the environment around the luminaires. Within embodiments in accordance with the present system, extension of the sliding member 413 and/or housing 404 can be varied to support the required distance of the sensor clip 108 from the luminaires 112 (see, for instance, FIG. 3), and once set, the sensor clip 108 maintains this distance, using mechanical means (not shown) as would be understood by one of ordinary skill in the art. Such mechanical fastening mechanisms include but are not limited to: providing the components using materials that allow for semi-frictional sliding, with or without using mechanical stops to keep the components from being separated. These figures depict one embodiment where the sensor clip 108 does not include an attenuation chamber or other filter devices.

Figure 4C:
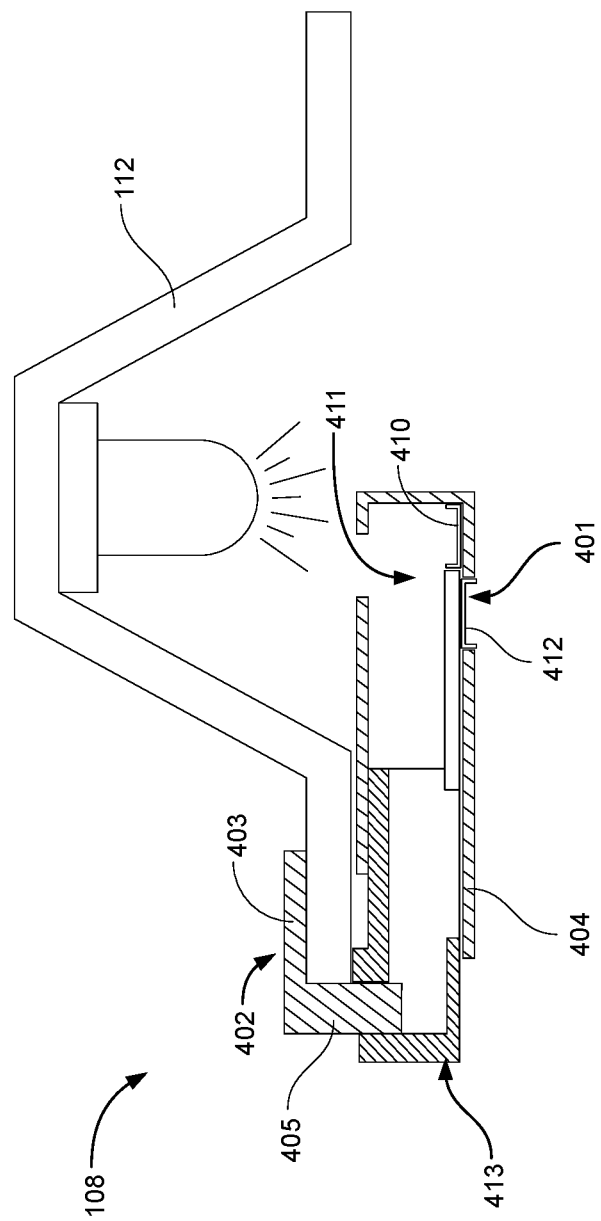
FIG. 4C is a sectional elevation view of the present sensor clip secured to the rim of a luminaire.

According to an aspect and as seen in FIG. 4C, the attachment arm 403 of the attachment member 402 is received above an edge or lip of luminaire 112 (with the lip of luminaire 112 being positioned between attachment arm 403 and sliding member 413 when the sliding member 413 is moved to its preferred vertical position, as shown). Thus, the attachment arm 403 is configured to grasp above the projecting lip of the luminaire. The movement of housing 404 with respect to sliding member 413 permits the color sensor 410 to be moved to a desired horizontal position below luminaire 112. As can be seen, the sliding member 413 is inserted into an open side of housing 404, (i.e., on the opposite side of housing 404 from color sensor 410). As would be understood by one of ordinary skill in the art, the sliding member 413 could be configured as a hollow member and for receiving the housing 404 inserted into a hollow portion of the sliding member 413 (not shown). In some embodiments, sliding member 413 is friction fit with housing 404. Mechanical stops and limiters can be used to ensure that sliding member 413 does not simply fall out of the side of housing 404 and become separated (not shown).

Similarly, it would be understood by one of ordinary skill in the art that a sufficient frictional fit between sliding member 413, attachment member 402 and housing 404 would be necessary to maintain the position of the sensor clip 108 in the desired position, once placed in contact with the luminaire. In other embodiments, the components of the sensor clip 108, (e.g., vertical leg 405, sliding member 413, and housing 404), could be cylindrical or tubular in nature.

Figure 5A:
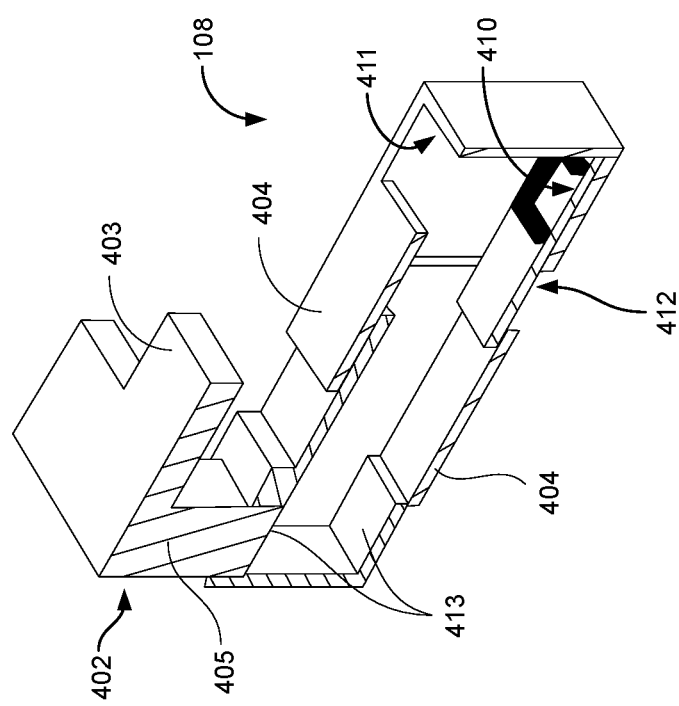
FIG. 5A illustrates a top perspective sectional view of a sensor clip in a fully extended position.
Figure 5B:
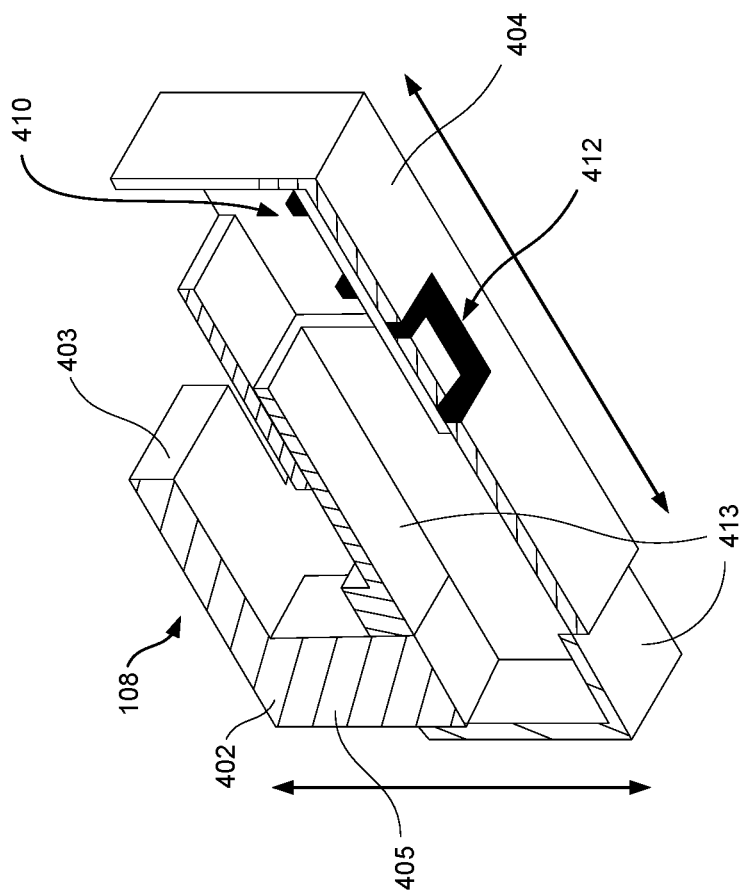
FIG. 5B illustrates a bottom perspective sectional view corresponding to FIG. 5A.

FIGS. 5A and 5B depict the sensor clip 108 in a fully extended position. In this position, the sliding member 413 is fully vertically extended relative to attachment member 402, and the housing 404 is fully horizontally extended relative sliding member 413. The color sensor 410 is thus positionable in a direction facing the luminaire (see, for instance, FIG. 4C) to receive the direct light of the luminaire and the environment sensor 412 is facing away from the direct light, and thus positioned for sensing the environment around the luminaires. Thus, the sensor clip is is mounted or attached to the luminaire by positioning the attachment member and sliding member into a mounted relationship with the luminaire.

Figure 6:
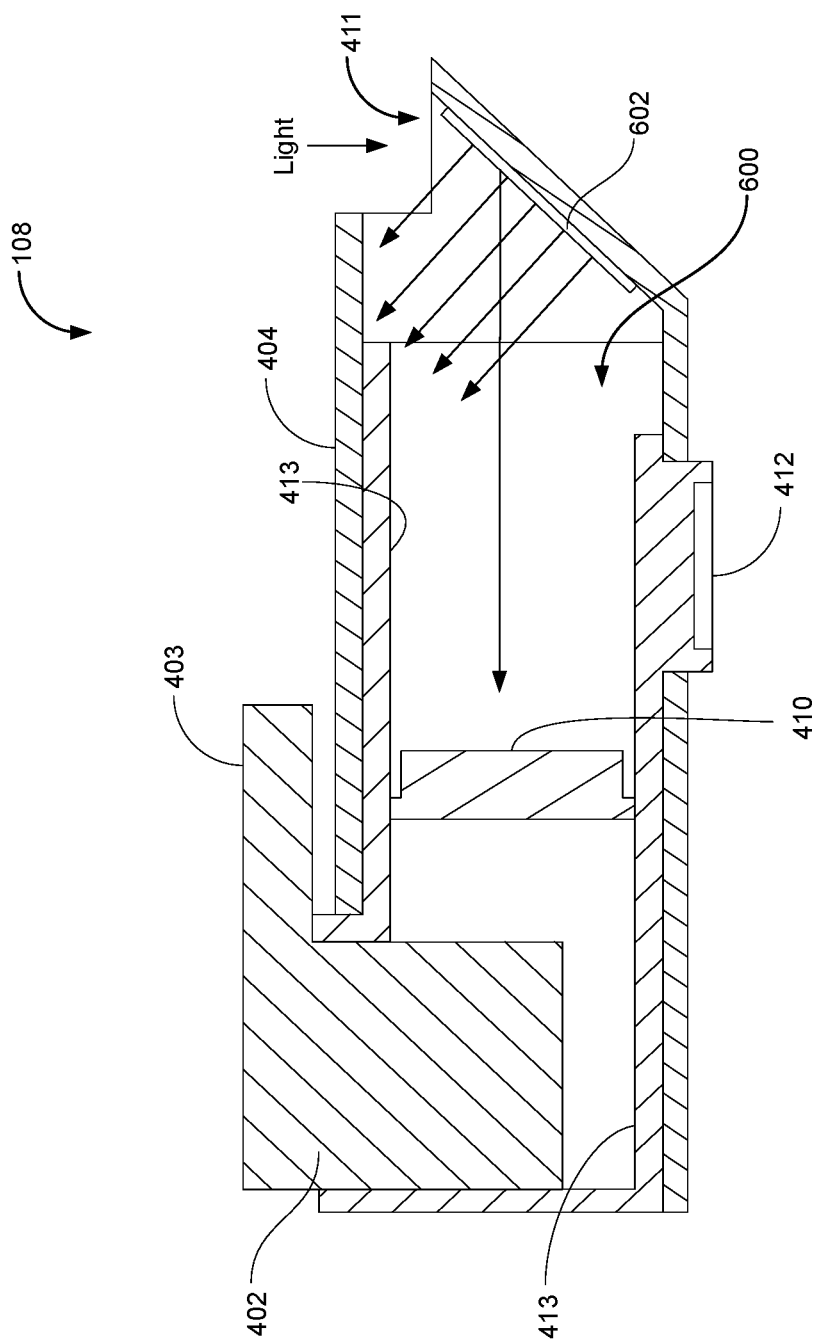
FIG. 6 illustrates a sensor clip system design with attenuation chamber.

FIG. 6 depicts the sensor clip system design with an attenuation chamber 600. In the attenuation chamber 600, incoming light coming from the luminaire is collected and collimated/attenuated to reduce the high luminous intensities of the incoming light. The attenuation chamber averages/lowers the light intensity to allow a better performance of the light/color sensor 410. In FIG. 6, the sensor clip 108 demonstrates positioning the color sensor 410 at a 90 degree angle to the environment sensor 412. Furthermore, color sensor 410 is encapsulated within attenuation chamber 600 (specifically, color sensor 410 is at the far end of the chamber), while on the other side of the chamber, the top opening 411 provides the entrance for the incoming light. A reflective material 602, such as a mirror, is provided to direct the incoming light from the luminaire towards the color sensor 410. The arrows show the direction of incoming and reflected light. As can be seen, some light is scattered within housing 404 prior to reaching color sensor 410. As shown herein, the color sensor 410 is attached to the sliding member 413 and the reflective material 602 is attached to the housing 404, such that when the housing 404 is moved relative to the sliding member 413, a distance between the reflective member 602 and the color sensor 410 is varied, thus allowing for more or less attenuation of the light directed from the luminaire to the sensor 410.

Figure 7A:
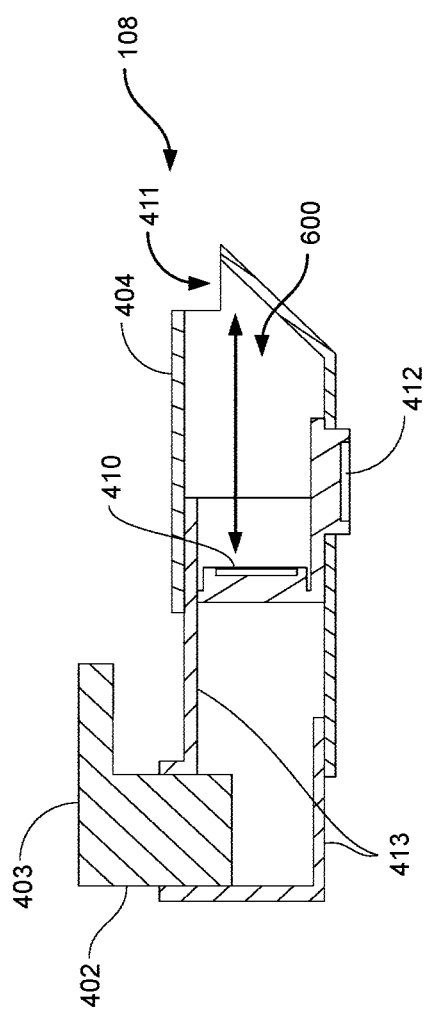
FIG. 7A illustrates a sectional elevation view of one embodiment of a sensor clip system with a fixed size attenuation chamber in an extended position.
Figure 7B:
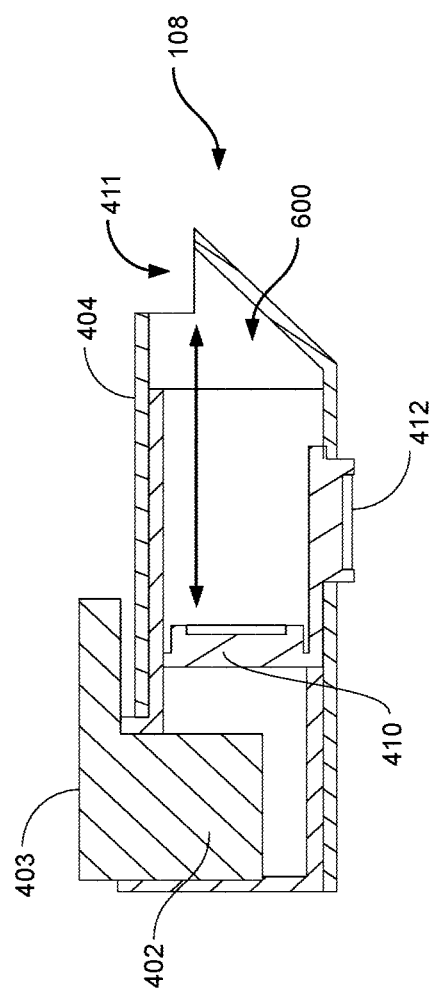
FIG. 7B illustrates a sectional elevation view corresponding to FIG. 7A, but in a retracted position.

FIGS. 7A and 7B depict one embodiment of the sensor clip system with a fixed size attenuation chamber 600. In this embodiment, the position of the sensor housing 404 is adjustable in a horizontal plane to have multiple different operational positions, from a fully compressed state or position (FIG. 7B) to a fully extended or expanded state or position (FIG. 7A). In this embodiment, the length of attenuation chamber 600 remains fixed; i.e., there is no change in the chamber and the distance of the color sensor 410 from the chamber light entrance opening 401a. To achieve such an arrangement, the color sensor 410 can be attached to the housing 404 such that movement of the housing 404 does not change the position of the sensor 410 relative to the opening 411. Both the color sensor 410 and the environment sensor 412 are positioned at 90 degrees to each other. Incoming light, after bouncing off of the reflective material 602, enters the fixed length attenuation chamber 600, losing its intensity and power and is attenuated to improve the performance and life expectancy of the color sensor 410.

Figure 8A:
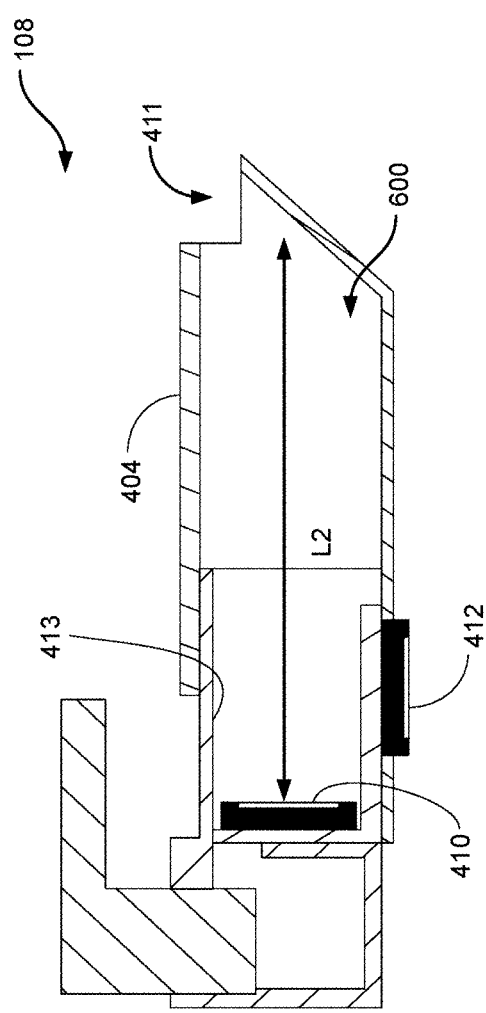
FIG. 8A illustrates a sectional elevation view of one embodiment of a sensor clip system with a variable length attenuation chamber in an extended position.
Figure 8B:
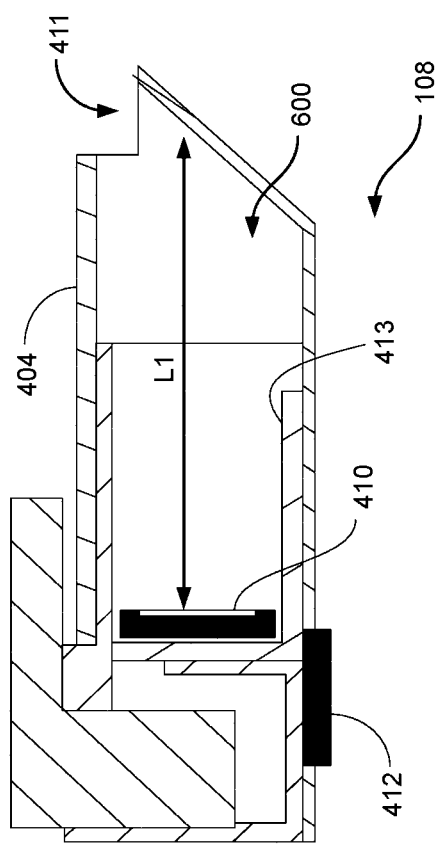
FIG. 8B illustrates a sectional elevation view corresponding to FIG. 8A, but in a retracted position.

FIGS. 8A and 8B depicts another embodiment of the sensor clip system with a variable length attenuation chamber 600. In this embodiment, the sensor clip 108 is adjustable in a horizontal plane to have a plurality of different operational positions, from a fully compressed position (FIG. 8B) to a fully expanded position (FIG. 8A). In this particular embodiment, the length of the attenuation chamber 600 varies significantly depending on the adjustment/re-adjustment of the length of the housing 404 in the horizontal plane/direction. Specifically, the attenuation chamber 600 length changes when the sensor housing 404 is slidably moved relative to the sliding member 413. Thus, in the fully extended position, length L2 defines the length of the attenuation chamber 600, while in the fully compressed position, length L1 defines the length of the attenuation chamber 600 such that L2 is greater than L1. Both the color sensor 410 and the environment sensor 412 may be fixed at a position that is about 90 degrees relative to each other. In other words, neither the color sensor 410 nor the environment sensor 412 move when the length of the attenuation chamber 600 changes. Both the color sensor 410 and the environment sensor 412 are fixed at a base/far side of the chamber 600. Extending the length of sensor clip 108 changes the distance between the entrance/opening of the chamber (at 411), where light is incoming, and the color sensor 410. This change will impact the amount of attenuation and is used to control the attenuation as well as to increase/decrease light exposure via the movement of the sensor 410 away from the opening 401.

Figure 9:
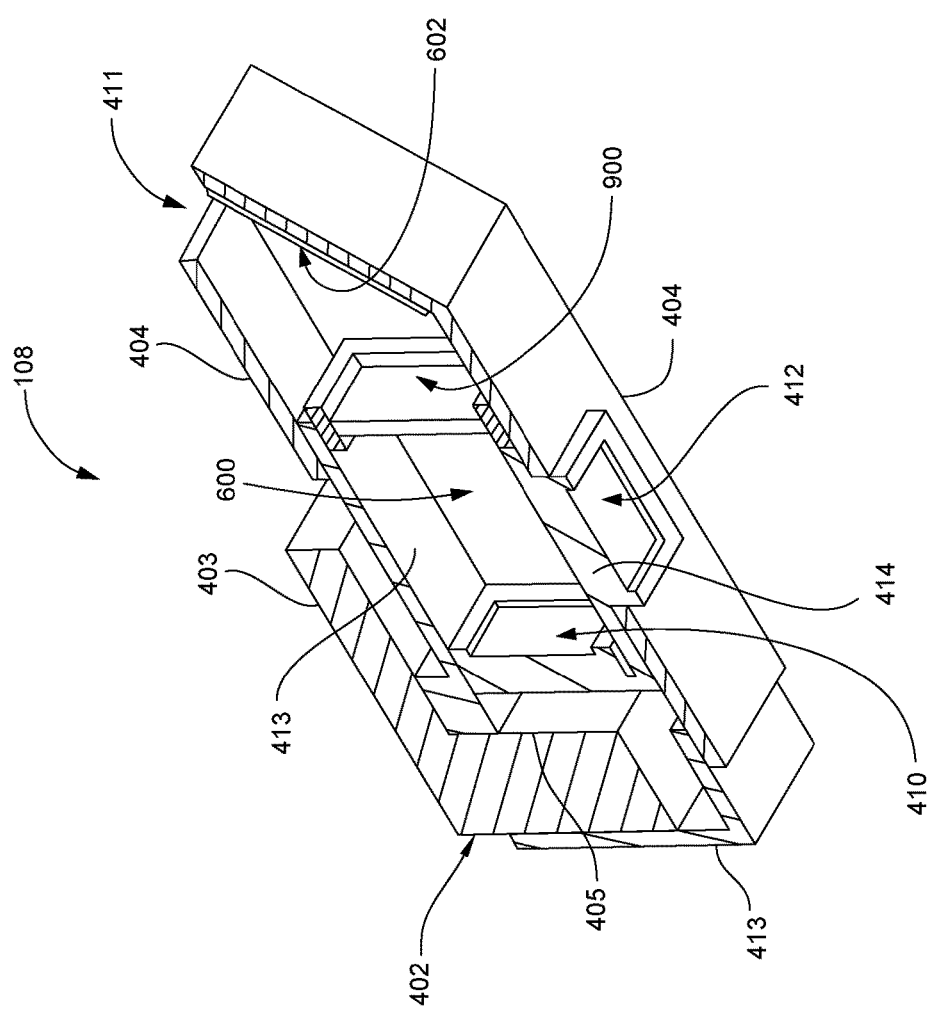
FIG. 9 illustrates a sectional bottom perspective view of one embodiment of a sensor clip system including a dynamic dampening and filtering screen.

FIG. 9 depicts one embodiment of the sensor clip system 108 in which a Dynamic Attachable Dampening and Filtering Screen 900 (DADFS) is present. The DADFS 900 can be used with a plurality of strengths, thus depending on the luminaire color and/or intensity, the installer can change the DADFS screen 900 from one strength to another. The DADFS 900 performs at least a filtering operation and/or at least a dampening operation, or a combination thereof. The filtering operation, as an example, can remove at least a portion of non-visible InfraRed (IR) or UltraViolet (UV) elements present in the incoming light. The dampening operation may reduce the high lux present in the incoming light. Both of these operations support extending a life or longevity of the color sensor 410. The color sensor 410, located inside the attenuation chamber 600, and the environment sensor 412, are once again positioned at about 90 degrees to each other as depicted in this embodiment. In this arrangement, however, the environment sensor 412 is positioned on a mounting member 414, which extends from an outer surface of the sensor housing 404. According to an aspect and as shown herein, the attenuation chamber 600 is fixed in size and is moving together with the DADFS 900 and the sensors as a single unit when the housing 404 is in the extended position. Thus, the color sensor 410 is positioned at the rear portion of the housing 404, and the DADFS 900 is positioned at a forward portion of the housing 404.

Figure 10:
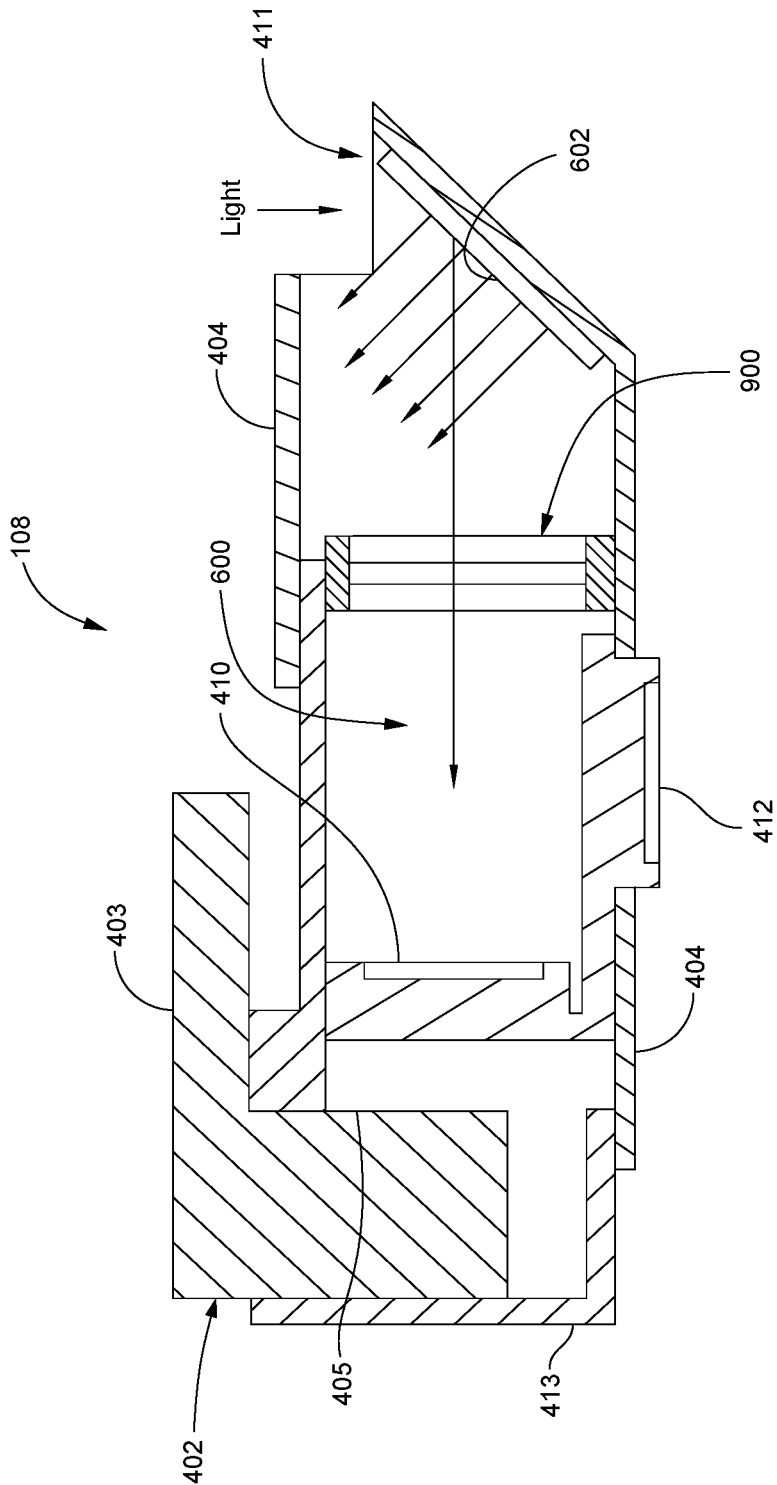
FIG. 10 further illustrates a sectional elevation view of one embodiment of a sensor clip system with dampening, filtering and attenuation of light.

FIG. 10 depicts one embodiment of the sensor clip system 108 with dampening, filtering and attenuation of light entering the clip structure. FIG. 10 is a cross-sectional side view of FIG. 9.

Figure 11A:
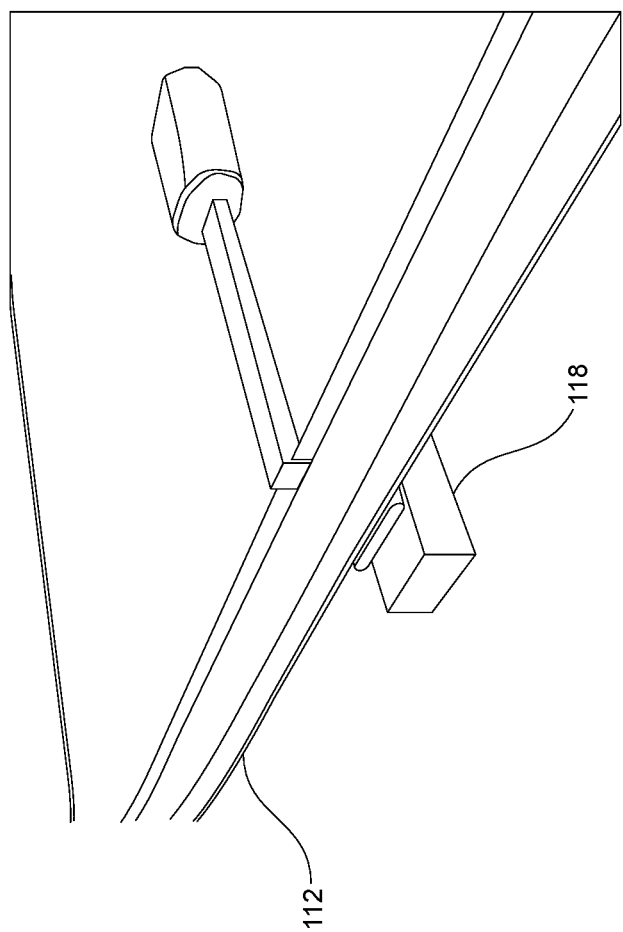
FIGS. 11A, 11B and 11C are various illustrations of a sensor clip fit onto a variety of different luminaires.
Figure 11B:
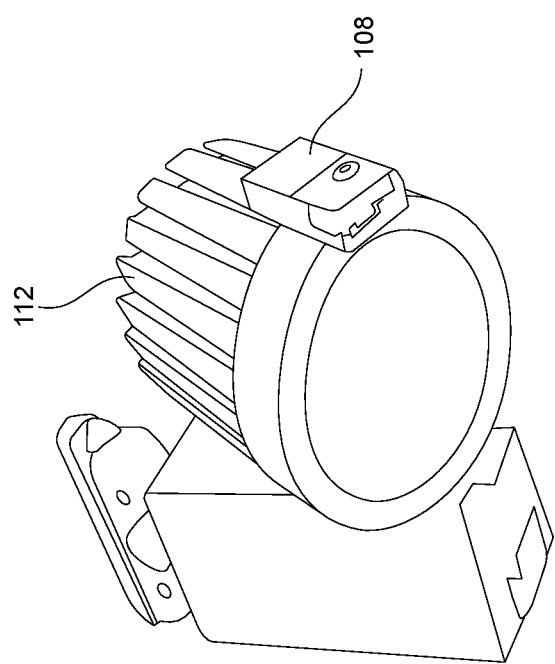
Figure 11C:
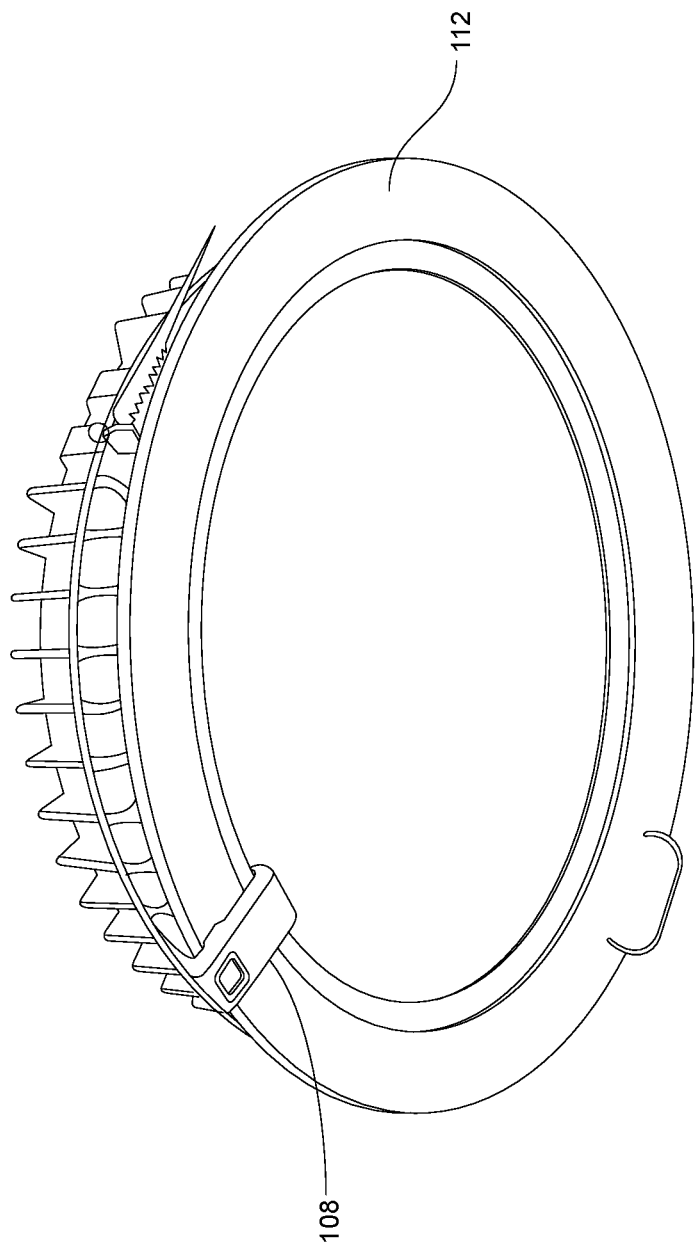

FIGS. 11A to 11C depict embodiments of the sensor clip 108 being attached to three different luminaire 112 models. FIG. 11A shows an attachment to a squared flat LED luminaire 112. FIG. 11B shows the sensor clip 108 attached to a commercial off the shelf luminaire 112. FIG. 11C shows an example for attachment to a circular flush-mounted luminaire 112.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The components of the apparatus illustrated are not limited to the specific embodiments described herein, but rather, features illustrated or described as part of one embodiment can be used on or in conjunction with other embodiments to yield yet a further embodiment. It is intended that the apparatus include such modifications and variations. Further, steps described in the method may be utilized independently and separately from other steps described herein.

While the apparatus and method have been described with reference to specific embodiments, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A luminaire sensor clip system, comprising:
   a housing having at least one light-receiving opening therein;
   a color sensor positioned within the housing, the color sensor being optically aligned with the light-receiving opening in the housing such that light from a luminaire is directly received by the color sensor;
   an environment sensor mounted on the housing in a position such that light from the luminaire is indirectly received by the environment sensor; and
   an attachment member for connecting the housing onto the luminaire, wherein the attachment member comprises a vertical leg, the vertical leg configured to receive a sliding member, and an attachment arm disposed at a substantially right angle to the vertical leg, the attachment arm configured for attachment to a luminaire.

2. The luminaire sensor clip system of claim 1, wherein the color sensor faces towards the luminaire and the environment sensor faces away from the luminaire.

3. The luminaire sensor clip system of claim 1, wherein the sliding member is slideably attached to the vertical leg and the housing is slideably attached to the sliding member such that movement of the sliding member and the housing relative to the attachment member allows movement between a compressed state and an expanded state.

4. The luminaire sensor clip system of claim 1, wherein the at least one light receiving opening is comprised of a top opening for receiving the color sensor and a bottom opening for receiving the environment sensor, and the top opening and the bottom opening are positioned at opposite sides of the housing.

5. The luminaire sensor clip system of claim 1, wherein the color sensor is positioned facing in an opposite direction from the environment sensor.

6. The luminaire sensor clip system of claim 1, wherein the housing further comprises:
   an attenuation chamber, and
   a reflective material,
   wherein the color sensor is positioned within the attenuation chamber and wherein the reflective material reflects light received in the light-receiving opening towards the color sensor.

7. The luminaire sensor clip system of claim 6, wherein the attenuation chamber has a fixed width or a variable width.

8. The luminaire sensor clip system of claim 6, wherein the attenuation chamber reduces high lux values of the light emitted by the luminaire before the light reaches the color sensor.

9. The luminaire sensor clip system of claim 6, wherein the color sensor and the reflective material are positioned at opposite ends of the attenuation chamber.

10. The luminaire sensor clip system of claim 1, further comprising:
    a dampening and filtering screen positioned between the light-receiving opening in the housing and the color sensor.

11. The luminaire sensor clip system of claim 10, wherein the dampening and filtering screen removes infrared and ultraviolet light elements from the luminaire light before the light reaches the color sensor.

12. A method of providing a sensor clip in a sensing relationship with light emitted from a luminaire, comprising:
    providing a sensor clip having a housing, wherein the sensor clip is dimensioned to be clipped onto a luminaire;
    providing various components to the sensor clip including an attachment member and sliding member, wherein the housing receives a color sensor and an environment sensor;
    positioning the attachment member and sliding member into a mounted relationship with the luminaire;
    positioning the housing such that the color sensor is positioned to receive direct light from the luminaire;
    receiving light from the luminaire into the housing such that the light is directed towards a color sensor positioned within the housing; and
    permitting light from the luminaire to reach the environment sensor on the housing, wherein the environment sensor is positioned such that light from the luminaire is not directed towards the environment sensor.

13. The method of claim 12, further comprising:
    positioning the color sensor such that it faces towards the luminaire; and
    positioning the environment sensor such that it faces away from the luminaire.

14. The method of claim 12, further comprising:
    positioning the color sensor to receive direct light from the luminaire; and
    positioning the environment sensor to receive indirect light from the luminaire.

15. The method of claim 12, further comprising:
    positioning the housing such that the environment sensor is positioned to receive indirect light from the luminaire.

16. The method of claim 12, further comprising:
    positioning a dampening and filtering screen in an attenuation chamber within the housing.

17. The method of claim 12, further comprising:
    removing infrared and ultraviolet light elements from the luminaire light before the light reaches the color sensor.

18. The method of claim 16, further comprising:
    reducing high lux values of the light emitted by the luminaire before the light reaches the color sensor by reflecting the light off the interior surface of the attenuation chamber.

* * * * *

UNITED STATES PATENT AND TRADEMARK OFFICE
CERTIFICATE OF CORRECTION

PATENT NO. : 9,874,478 B1  
APPLICATION NO. : 15/586745  
DATED : January 23, 2018  
INVENTOR(S) : Simon Coombes et al.

Page 1 of 1

It is certified that error appears in the above-identified patent and that said Letters Patent is hereby corrected as shown below:

On the Title Page

Related U.S. Application Data, Item (63), delete "Continuation" and add -- Continuation-in-part --

Signed and Sealed this
Fourteenth Day of August, 2018

Andrei Iancu
*Director of the United States Patent and Trademark Office*